United States Patent
Yanagisawa et al.

[11] 3,827,066
[45] July 30, 1974

[54] MEMORY TYPE EXPOSURE CONTROL SYSTEM

[75] Inventors: Takeshi Yanagisawa, Kanagawa-ken; Kinzi Tanikoshi; Yusuke Ono, both of Tokyo, all of Japan

[73] Assignee: Canon Kabushiki Kaisha, Tokyo, Japan

[22] Filed: June 5, 1973

[21] Appl. No.: 367,219

Related U.S. Application Data
[62] Division of Ser. No. 44,670, June 9, 1970, Pat. No. 3,750,540.

[30] Foreign Application Priority Data
June 13, 1969   Japan................................ 44-46555

[52] U.S. Cl. .................................................. 354/51
[51] Int. Cl. ................................................ G03b 7/08
[58] Field of Search................................... 95/10 CT

[56] References Cited
UNITED STATES PATENTS

| | | | |
|---|---|---|---|
| 3,205,803 | 9/1965 | Burgarella et al. ................. | 95/10 X |
| 3,245,332 | 4/1966 | Kagan.................... | 95/10 X |
| 3,426,357 | 2/1969 | Pueghes............................ | 95/10 UX |
| 3,460,450 | 8/1969 | Ogihara.................................. | 95/10 |
| 3,470,798 | 10/1969 | Miyakawa.............................. | 95/10 |
| 3,533,348 | 10/1970 | Yanagi................................... | 95/10 |
| 3,551,059 | 12/1970 | Kitai................................... | 95/10 X |
| 3,555,984 | 1/1971 | Rentschler............................ | 95/10 |
| 3,562,600 | 2/1971 | Koenig.............................. | 95/10 X |
| 3,602,717 | 8/1971 | Konig.............................. | 95/10 X |
| 3,641,890 | 2/1972 | Ono....................................... | 95/10 |

*Primary Examiner*—Samuel S. Matthews
*Assistant Examiner*—Michael L. Gellner
*Attorney, Agent, or Firm*—Toren, McGeady and Stanger

[57] ABSTRACT

A memory type exposure control system for controlling the shutter speed of a camera wherein an electrical change of a photovoltaic element on which the light from a scene being photographed impinges through the photographic objective of the camera is amplified by an amplifier circuit and is memorized by a memory condenser in the form of a voltage, and the memorized voltage is applied to a field effect transistor of which the output resistance effected thereby is combined with another condenser to constitute a shutter speed controlling-RC timing circuit whereby the delay time determines the duration of shutter control pulse, an improvement being effected in the sensor circuit so that the memory type exposure control system is made sufficiently responsive to a wider range of incident light intensity than was ever possible.

5 Claims, 4 Drawing Figures

PATENTED JUL 30 1974 3,827,066

MEMORY TYPE EXPOSURE CONTROL SYSTEM

CROSS REFERENCE TO PRIOR APPLICATION

This is a divisional of U.S. patent application Ser. No. 44,670, filed June 9, 1970, now U.S. Pat. No. 3,750,540; issued Aug. 7, 1973.

BACKGROUND OF THE INVENTION

1. Field of the Invention

This invention relates to an exposure control system provided with memory means which is adapted for use with TTL type single lens reflex cameras, etc., and more particularly to an exposure control system capable of highly accurate memorization of information over a wide range of luminace of a scene being photographed which, in accordance therewith, controls the period of actuation of a camera shutter mechanism.

2. Description of the Prior Art

In general, single lens reflex cameras of TTL type in which the photometry for the light from a scene being photographed is performed through the photographic objective are so designed that upon actuation of the shutter releasing button, the reflecting mirror incorporated in the camera finder optical system will pivot upwardly to permit film exposure, thereby the path of light rays is interrupted, while nevertheless often disposing the photosensitive element within the finder optical system. In this case, therefore, the shutter control system is constructed as establishing a procedure of memorization followed by regeneration of an electrical signal of the sensor.

In the conventional shutter speed control system, the photosensitive element mentioned above is a cadmium sulfide photocell. As shown by a typical characteristic curve in FIG. 1, however, the ability of the CdS photocell to function in the system is such that although a variation of resistance with illumination is linear within a limited range, the linearity is not retained for lower and higher luminaces. Therefore, the use of a CdS photocell as the photosensitive element makes it difficult to provide a memory type exposure control system capable of being responsive to a wide dynamic range of shutter speed control. Further, it would be the most ideal, if the memory type exposure control system were designed so as to be responsive to that luminance of a scene being photographed which is available just before the shutter actuation. However, in connection with a time delay necessary for charging a condenser incorporated as a memory means, a slow response time of the CdS photocell increases the inertia of the conventional memory type exposure control system so largely that the information which is detected in accordance with that scene luminance which is available just before the shutter actuation could not be obtained to compute and set the optimum exposure for the scene luminance.

An object of this invention is to provide a near-ideal memory type exposure control system of which the inertia is reduced by the use of a fast response time photovoltaic element as the photosensitive element so that the shutter actuation is effected in accordance with that luminance of a scene being photographed which is available just before the shutter actuation.

Another object of this invention is to provide a memory type exposure control system incorporating as the photosensitive element a photovoltaic element such as a photodiode which permits suitable shutter speed control over an extremely wide range of luminace of a scene being photographed.

These and other objects of this invention will become more apparent from the following detailed description of one embodiment of this invention.

DESCRIPTION OF THE PREFERRED EMBODIMENT

Figure 2:
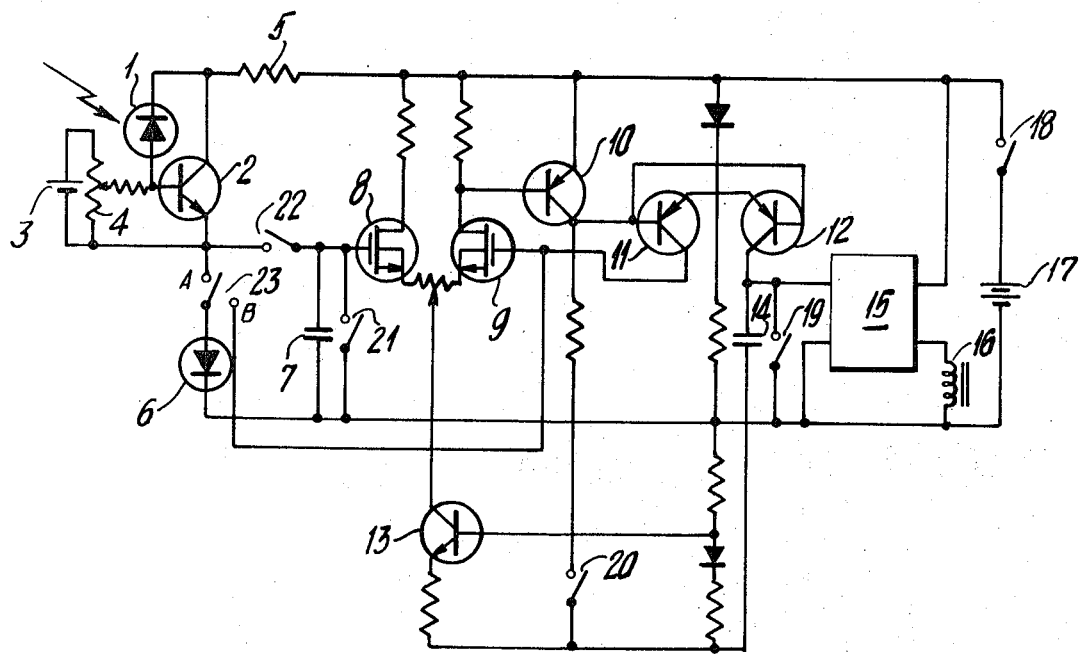
FIG. 2 is a circuit diagram illustrating one embodiment of a memory type exposure control system according to this invention

The embodiment of this invention will now be explained with reference to the drawings. FIG. 2 is a circuit diagram showing the memory type exposure control system including a sensor circuit composed of a photovoltaic element 1 such as a photodiode, a transistor 2, a power source 3 of the sensor circuit, a variable resistor 4 for voltage adjustment and a collector resistance 5 of the transistor 2. There are further included log-diode 6, memory condenser 7, field effect transistors 8 and 9 constituting a differential amplifier, an amplifier transistor 10, output stage transistors 11 and 12 constituting another differential amplifier, transistor 13 of a constant current circuit, condenser 14 of a shutter speed control circuit, said condenser 14 in combination with a resistance ($R_{CE}$) between the collector and emitter of transistor 12 constituting a time delay circuit, Schmitt trigger circuit 15, electromagnet 16, power ource 17, and switches 18 through 23.

Figure 1:
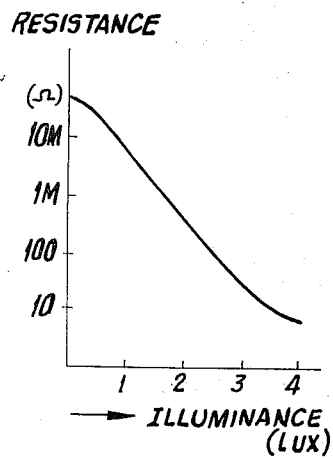
FIG. 1 is a resistance vs. illuminance response characteristic curve of a cadmium sulfide photocell.
Figures 3A, 3B:
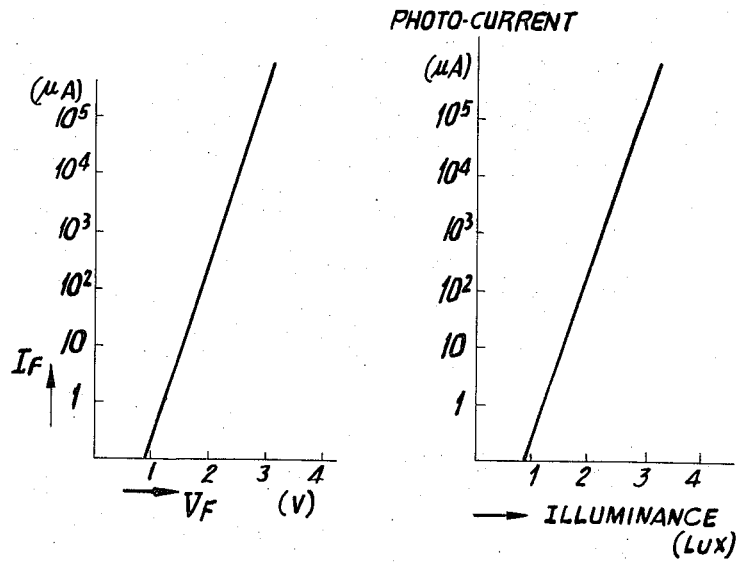
FIG. 3a is a voltage-current characteristic curve of a log-diode incorporated in the circuit shown in FIG. 2
FIG. 3b is a photocurrent vs. illumination response characteristic curve of a photodiode incorporated in the circuit shown in FIG. 2.

Referring to FIG. 2, having passed through the photographic objective of a camera, the light from an scene to be photographed is reflected from the reflecting mirror, impinging on the photodiode 1 disposed in the finder optical system. A photocurrent caused thereby to flow in said photodiode is amplified by transistor 2 appropriately biased by power source 3 and variable resistor 4. Now assuming that power switch 18 is on, switch 21 is off, switch 22 is on and switch 23 is set at connection A, the output current of transistor 2 is allowed to flow through log-diode 6 and collector resistance 5 so that a voltage is caused to generatte between the both terminals of log-diode 6. The voltage charges the memory condenser 7. A typical characteristic curve of the log-diode is shown in FIG. 3a, in which logarithm of current, log $I_F$, is plotted against voltage, $V_F$. The log $I_F$ vs. $V_F$ curve is linear so that the sensor signal is memorized in the memory condenser in the form of a voltage as compressed logarithmically. When the shutter releasing button is pushed down in a first one-step progression, the reflecting mirror pivots upwardly, and, in engagement therewith, switch 22 is turned off, switch 23 is changed over to connection B, switch 20 is turned on, and switch 19 is turned off, so that the voltage memorized in condenser 7 is applied across said log-diode 6 connected to connection B. A circuit composed of transistors 10, 11 and 12 has a function of transforming the value of the memory voltage applied across the log-diode to an emitter-collector resistance value of transistor 12, thereby the output current value of transistor 12 can be made equal to, or can be made to correspond to the value of current flowing through transistor 2 of the sensor circuit. Therefore, a timing circuit comprising, in combination, the output resistance of transistor 12 and condenser 14 may be adapted to control the camera shutter speed control mechanism through Schmitt trigger circuit 15, responsive to the timing circuit, for energizing and deenergizing electromagnet 16. As has been explained above, according to this invention, the exposure control system can be made responsive to an extremely wide dynamic range of a shutter speed control by using as the photovoltaic element as photodiode having such a characteristic curve as shown in FIG. 3b. In contrast to the cadmium sulfide photocell, the light response speed of the photodiode is retained even for low illuminations. In this point, the photodiode is efficient enough to make the exposure control system responsive to fast shutter speeds. Such an efficiency is valid even in the memory type exposure control system of this invention. The transistor 13 shown in FIG. 2 acts as a constant current circuit of a differential amplifier composed of field effect transistors 8 and 9. While this invention has been illustrated in FIG. 2 as employing a trigger circuit of Schmitt type, it may be substituted by another type trigger circuit. Further, in the exposure control system of this invention, the photosensitive element is a photodiode, but this invention is not limited thereby, and it may be practiced by the use of another photoviltaic element, such as a silicon photovoltaic cell, inasmuch as the resistance vs. illuminace response characteristic curve has a straight-line portion extending over sufficient wide range.

It will be seen from the foregoing description that the described embodiment of this invention accomplishes the above-mentioned objects by employing as the photosensitive element a photovoltaic element, for example, a photodiode of excellent linearity in combination with a log-diode that permits the photocurrent variation to be memorized in compressed form, and that this invention contemplates an exposure control system capable of being responsive accurately to much wider dynamic range of shutter speed control than was ever possible which is adapted for use with a TTL type single lens reflex camera by provision of a high photographic performance. Further, inasmuch as the used photovoltaic element has a high response speed, the shutter actuation can be made in accordance with that iluminance of a scene being photographed which is available just before the shutter actuation to effect the optimum exposure for the scene luminace, thus the photovoltaic element defined above contributing a near-ideal exposure control performance to the memory type exposure control system.

What is claimed is:

1. A memory type exposure control system comprising:
    a photovoltaic element on which the light from a scene being photographed is incident through the photographic objective of a camera,
    an amplifier means having input and output terminals to which said photovoltaic element is connected at said input terminal to amplify the electrical output of said element,
    a memory means for memorizing the electrical output of said photovoltaic element through said amplifier means, said means being connected to the output terminal of the amplifier means,
    a regenerator means for regenerating a level corresponding to the memorized level of said memory means, said means having input and output terminals,
    a differential amplifier means connected between said memory means and said regenerator means whereby the regenerated level being put in comparison with the memorized level,
    a timing circuit for controlling the shutter speed comprising a condenser connected to the output terminal of said regenerator means, and a switching circuit of a certain threshold for detecting the terminal voltage of said condenser, said regenerated output level being altered as acting as a resistance element of a RC time constant circuit.

2. The memory type exposure control system described in claim 1, wherein said memory means being connected in parallel with said amplifier means, and being provided with a switch means which when turned off permits the memorized level of the amplifier means to be held.

3. The memory type exposure control system described in claim 1 wherein said photovoltaic element being connected between the base and collector of a transistor used as the amplifier means.

4. The memory type exposure control system described in claim 1, wherein a log-diode being connected to the output of the amplifier means and in parallel with said memory means.

5. The memory type exposure control system described in claim 1, wherein a change over switch means being arranged in such a way that said log-diode can be connected by the changeover switch means either into the amplifier means or to the regenerator means.

* * * * *